(12) United States Patent
Showalter

(10) Patent No.: US 7,547,265 B2
(45) Date of Patent: *Jun. 16, 2009

(54) VARIABLE BIASING DIFFERENTIAL

(75) Inventor: Dan J. Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/397,038

(22) Filed: Apr. 3, 2006

(65) Prior Publication Data

US 2006/0178242 A1 Aug. 10, 2006

Related U.S. Application Data

(62) Division of application No. 10/795,373, filed on Mar. 8, 2004, now Pat. No. 7,037,231.

(51) Int. Cl.
F16H 48/04 (2006.01)

(52) U.S. Cl. .................. 475/225; 475/175; 475/201; 475/221; 475/249

(58) Field of Classification Search .................. 475/337, 475/330, 116, 248, 249, 201, 221, 332, 174, 475/175, 250, 295, 252, 243, 225; 180/372
See application file for complete search history.

(56) References Cited

U.S. PATENT DOCUMENTS

| 4,400,996 A | 8/1983 | Schou |
| 4,498,355 A | 2/1985 | Schou |
| 4,665,769 A | 5/1987 | Parsons |
| 4,779,699 A | 10/1988 | Hatano |
| 4,973,296 A * | 11/1990 | Shibahata ................... 475/231 |
| 5,295,921 A | 3/1994 | Ippolito et al. |
| 5,370,588 A * | 12/1994 | Sawase et al. ................. 475/84 |
| 5,464,084 A * | 11/1995 | Aoki et al. ..................... 192/35 |
| 5,497,845 A | 3/1996 | Shibahata |
| 5,531,653 A | 7/1996 | Barnholt |
| 5,556,344 A | 9/1996 | Fox |
| 5,839,328 A | 11/1998 | Showalter |
| 5,902,205 A | 5/1999 | Williams |
| 5,904,634 A * | 5/1999 | Teraoka ....................... 475/231 |
| 5,915,513 A * | 6/1999 | Isley et al. ..................... 192/35 |
| 5,954,173 A * | 9/1999 | Sakai et al. .................... 192/35 |
| 6,142,905 A * | 11/2000 | Brown et al. ................ 475/206 |
| 6,168,545 B1 | 1/2001 | Lowell |
| 6,283,887 B1 * | 9/2001 | Brown et al. ................ 475/204 |
| 6,540,634 B2 | 4/2003 | Thompson |
| 6,796,412 B2 * | 9/2004 | Teraoka ....................... 192/35 |

* cited by examiner

Primary Examiner—Sherry Estremsky
(74) Attorney, Agent, or Firm—Brinks Hofer Gilson & Lione

(57) ABSTRACT

A variable biasing differential provides an adjustable torque bias between two outputs. An input shaft provides drive torque to a carrier which receives a plurality of stub shafts and a like plurality of planet gears. A first set of planet gears drives a first sun gear and first output and a second set of planet gears, which, in turn, drives additional planet gears which drive a second sun gear and second output. Secured to both ends of the carrier are first and second ring gears which each mesh with an eccentric gear which in turn includes an eccentric second ring gear which meshes with an internal gear disposed about the first and second outputs. These gears are coupled to respective first and second friction clutches which can be independently activated to adjust the torque bias of the differential.

18 Claims, 8 Drawing Sheets

US 7,547,265 B2

VARIABLE BIASING DIFFERENTIAL

CROSS-REFERENCE TO RELATED APPLICATION

This patent application is a divisional application of and claims priority to U.S. patent application Ser. No. 10/795,373, filed Mar. 8, 2004, entitled "Variable Biasing Differential," now U.S. Pat. No. 7,037,231, granted May 2, 2006.

BACKGROUND OF THE INVENTION

The present invention relates generally to motor vehicle differentials and more particularly to a differential wherein the torque bias between a pair of outputs may be adjusted.

Geared differentials have been a component of motor vehicle drive trains from the earliest designs. In even the earliest vehicles, it became apparent that turning a corner and the wheel speed differences created between the inner and outer driving wheels during such maneuvers must be accommodated by the drive system.

While the standard bevel gear differential has accommodated this wheel speed difference for decades, improvements have occurred. For example, limited slip differentials which utilize a clutch having a preset torque limit prevent independent rotation until the forces acting upon the wheels and torque acting upon the axles exceeds a preset value. This addressed a common shortcoming of open differentials which, without such a feature, would direct drive torque to the tire on the slipperier surface, thereby frequently causing a vehicle to be trapped or stuck unnecessarily in snow, ice or mud.

Typically differentials are constructed with an equal, i.e., 50-50 torque split. This is true whether they are realized in front or rear axles or as an interaxle or center differential. In a center or interaxle differential, differentials have also been configured to provide, for example, a 40-60 torque split or a torque split other than 50-50.

The vast majority of active differentials include a mechanism which transfers torque from the faster rotating output to the slower rotating output. There are situations where it would be desirable to transfer torque from the slower rotating output to the faster rotating output. Those conditions include when wheel slip initially occurs on the rear wheels when in a corner. When turning, the front wheels are turning at a higher average speed than the rear. If the biasing mechanism is applied before the average wheel speed of the rear wheels is greater than the average speed of the front, the results will be counterproductive. The traditional active differential may not have the relative shaft speeds in the proper direction or may have an insignificant relative speed difference, causing the biasing clutches to be ineffective in creating the desired change in vehicle handling or yaw.

The present invention is directed to a differential configuration wherein the torque split between two outputs is adjustable in real time.

SUMMARY OF THE INVENTION

A variable biasing differential provides an adjustable torque bias between two outputs. An input shaft provides drive torque to a carrier which receives a plurality of stub shafts and a like plurality of planet gears. A first set of planet gears drives a first sun gear and first output and a second set of planet gears, which, in turn, drive additional planet gears which drive a second sun gear and second output. Secured to both ends of the carrier are first and second ring gears which each mesh with an offset gear which in turn includes an offset second ring gear which meshes with an internal gear disposed about the first and second output shafts. These gears are coupled to respective first and second friction clutches which can be independently activated to adjust the torque bias of the differential. A second embodiment having a single friction clutch pack is also disclosed.

The torque distribution across a variable biasing differential can have a substantial effect of the vehicle handling by shifting the force factors at the tire patch. It can cause the handling of a vehicle to approach oversteer, understeer or neutral steer in accordance with the desires of the vehicle manufacturer and vehicle safety considerations. A variable biasing differential, according to the present invention, can direct drive torque to a desired output under any normal driving condition creating a torque balance of, for example, 80-20 to 20-80. This differential can therefore overcome many of the weaknesses found in traditional differentials and active differential systems.

Thus it is an object of the present invention to provide a variable biasing differential for use on motor vehicles.

It is a further object of the present invention to provide a variable biasing differential having a planetary gear differential assembly and a pair of friction clutch packs.

It is a still further object of the present invention to provide a variable biasing differential for use as either a differential on a front or rear axle or as a center or interaxle differential.

It is a still further object of the present invention to provide a variable biasing differential having a planetary gear differential, a pair of offset gear trains and a pair of friction clutches.

Further objects and advantages of the present invention will become apparent by reference to the following description of the preferred embodiment and appended drawings wherein like reference numbers refer to the same component, element or feature.

DETAILED DESCRIPTION OF THE PREFERRED AND ALTERNATE EMBODIMENTS

Figure 1A:
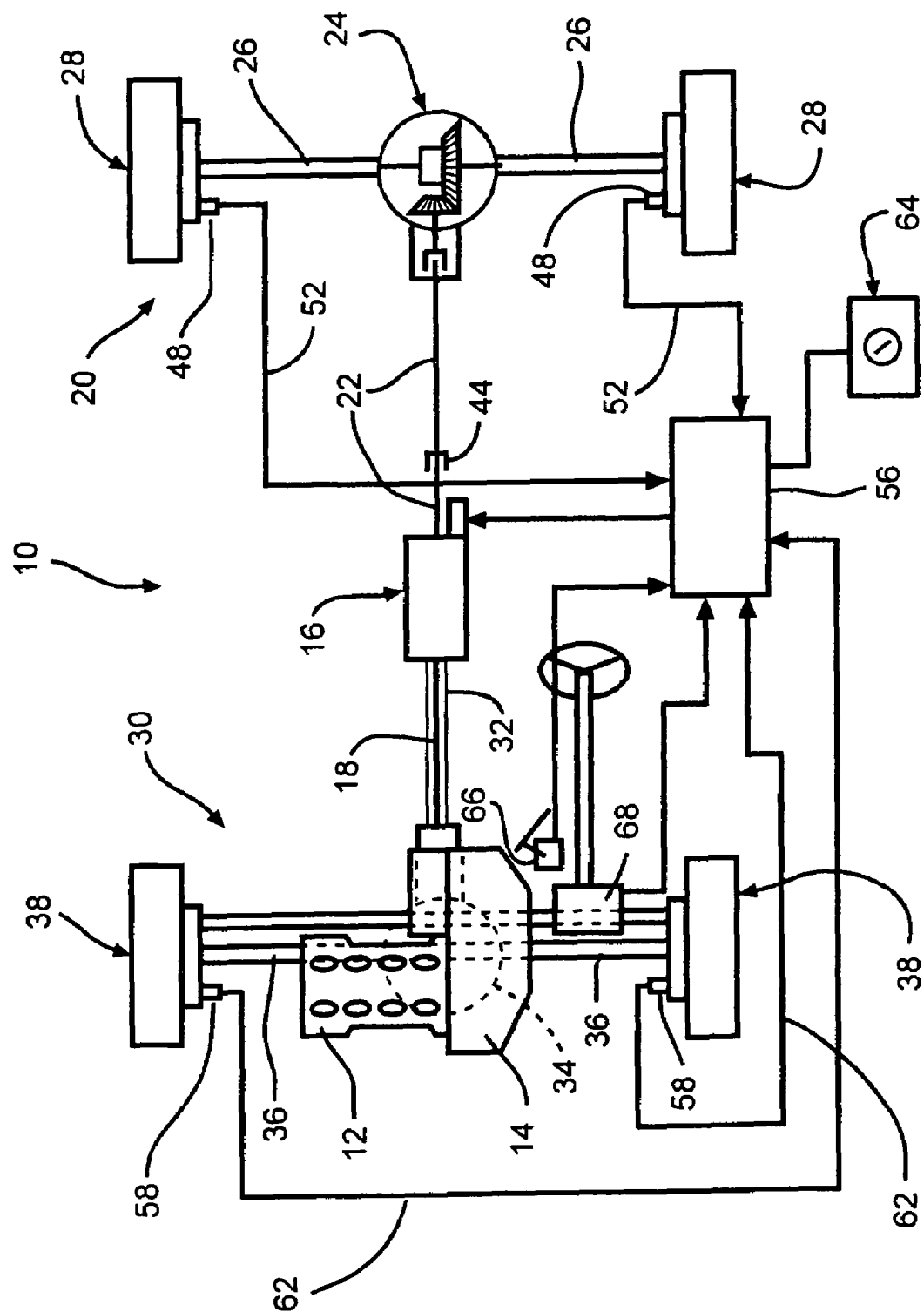
FIG. 1A is a diagrammatic view of a motor vehicle drive train having a variable biasing differential according to the present invention utilized as a center or interaxle differential.

Referring now to FIG. 1A, a four-wheel vehicle drive train utilizing the present invention is diagrammatically illustrated and designated by the reference number 10. The four-wheel vehicle drive train 10 includes a prime mover 12 such as an internal combustion gas or Diesel engine or a hybrid power plant. The prime mover 12 may be either longitudinally or transversely oriented. The prime mover 12 has an output which is coupled to and directly drives a transmission 14. The output of the transmission 14 directly drives a variable biasing differential assembly 16 through an input shaft 18. The variable biasing differential assembly 16 provides drive torque to a primary or rear driveline 20 comprising a primary or rear prop or output shaft 22, a primary or rear differential 24, a pair of live primary or rear axles 26 and a respective pair of primary or rear tire and wheel assemblies 28.

The variable biasing differential assembly 16 also provides drive torque to a secondary or front driveline 30 comprising a secondary or front prop or output shaft 32 which is disposed concentrically about the input shaft 18, a secondary or front differential 34, a pair of live secondary or front axles 36 and a respective pair of secondary or front tire and wheel assemblies 38. Preferably, the front tire and wheel assemblies 38 are directly coupled to the respective front axles 36 although manual or remotely activatable locking hubs (not illustrated) may be operably disposed between the front axles 36 and the respective tire and wheel assemblies 38 to selectively connect same if desired. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction system. Signals from the sensors 48 are provided in lines 52 to a microprocessor 56. Similarly, disposed in sensing relationship with each of the front tire and wheel assemblies 38 are respective wheel speed sensors 58 which provide signals to the microprocessor 56 in the lines 62. Once again, the sensors may be independent or may be part of or shared with an antilock brake system or other vehicle traction control or system.

Frequently, an operator selectable switch 64 or set of push buttons may be utilized and will be generally disposed within reach of the vehicle operator in the passenger compartment (not illustrated). The switch 64 may be adjusted, for example, to enable or disable the variable biasing differential assembly 16. Additionally, a throttle position sensor 66 may be utilized to provide a signal to the microprocessor 56 indicative of the real time position of the throttle or accelerator pedal and a steering angle sensor 68 may similarly provide a signal to the microprocessor 56 indicative of the real time angular orientation of the front or primary tire and wheel assemblies 38.

Figure 2:
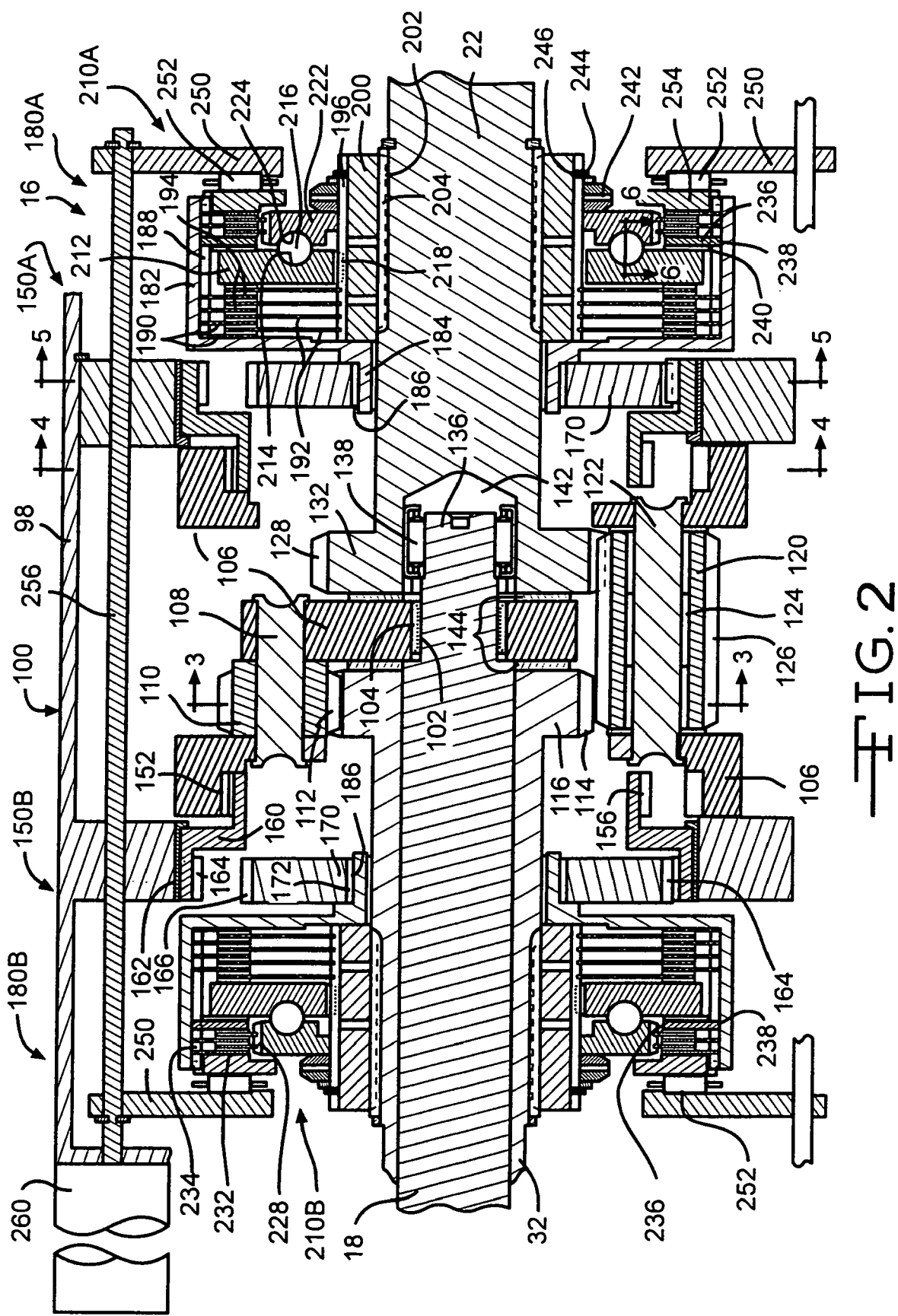
FIG. 2 is a full, sectional view of a first embodiment of a variable biasing differential according to the present invention.
Figure 3:
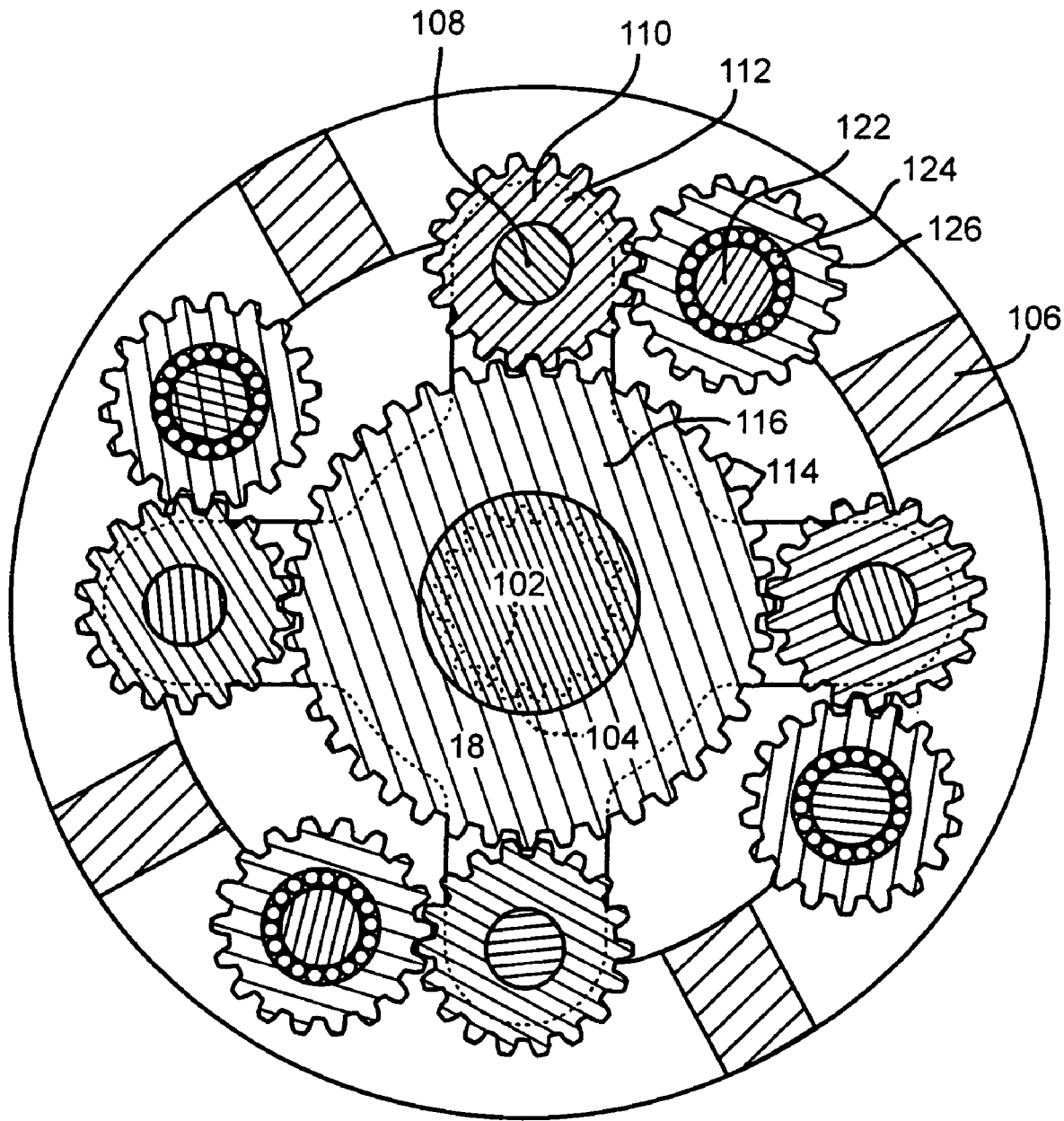
FIG. 3 is a full, sectional view of a first embodiment of a variable biasing differential according to the present invention taken along line 3-3 of FIG. 2.
Figure 4:
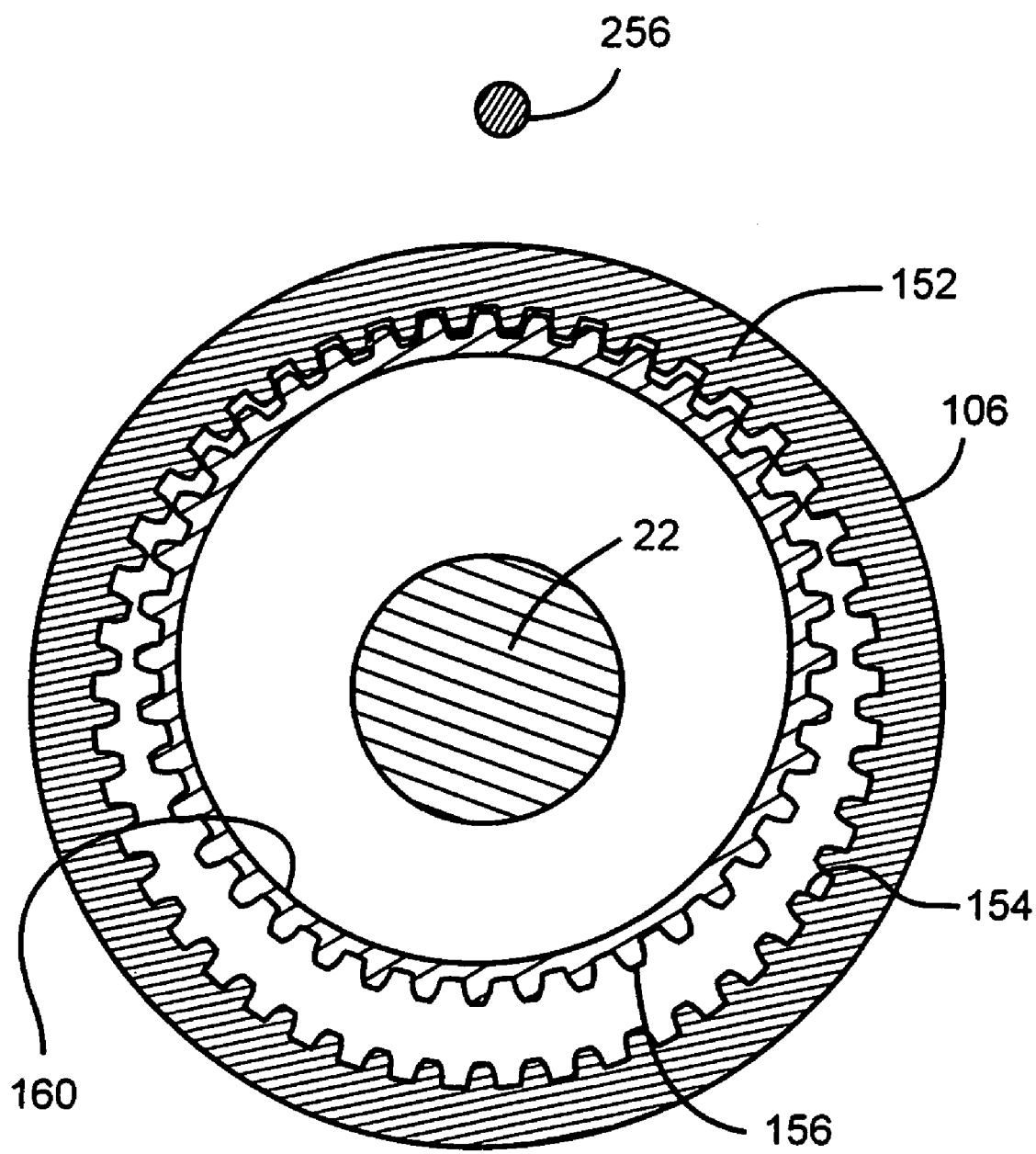
FIG. 4 is a full, sectional view of a first embodiment of a variable biasing differential according to the present invention taken along line 4-4 of FIG. 2.
Figure 5:
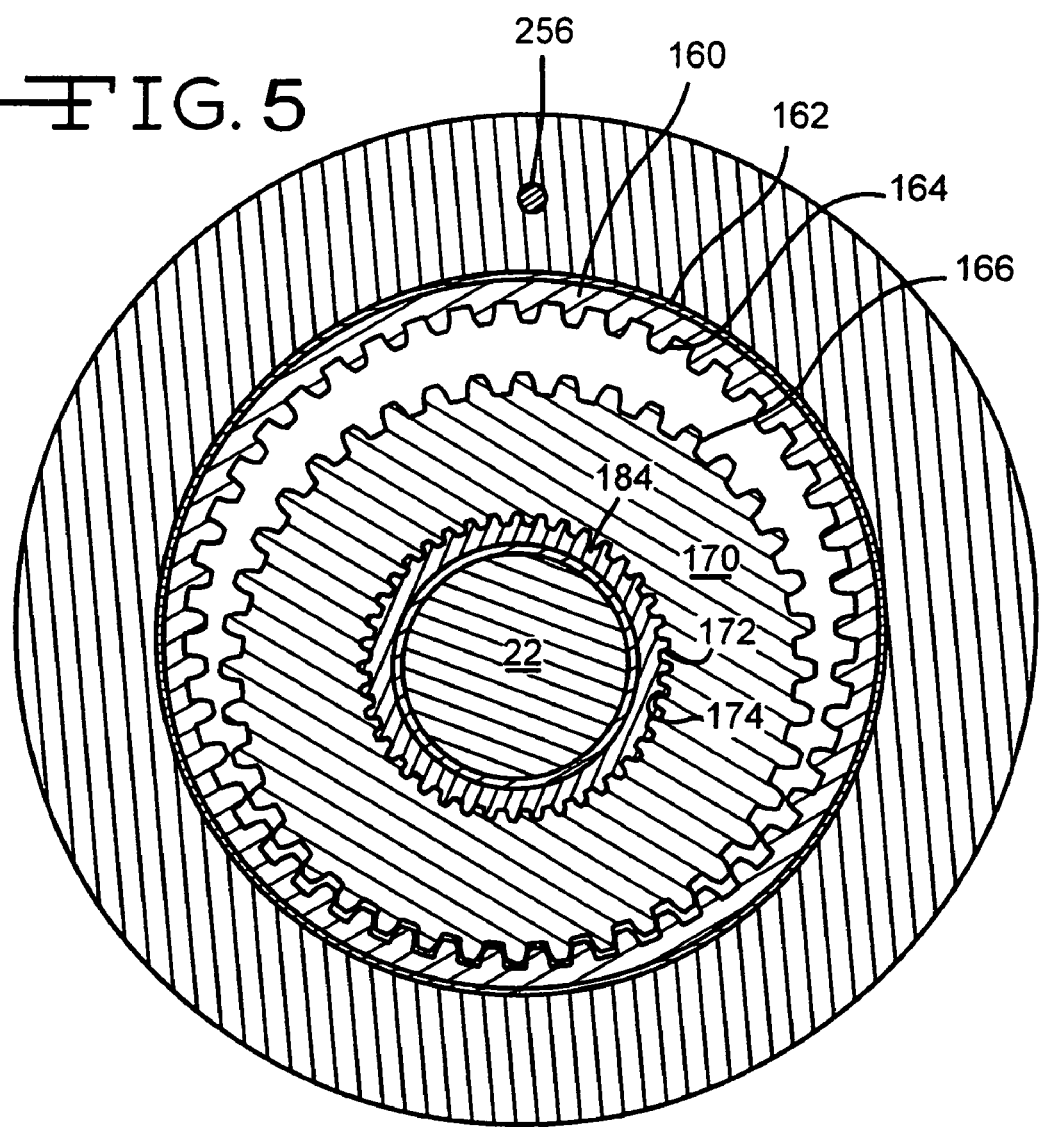
FIG. 5 is a full, sectional view of a first embodiment of a variable biasing differential according to the present invention taken along line 5-5 of FIG. 2.

Referring now to FIG. 2, the variable biasing differential assembly 16 includes a preferably cast metal housing 98 having various features which receive and support components of the differential assembly 16 such as a planetary gear differential assembly 100. The planetary gear differential assembly 100 is driven by the input shaft 18 which includes a plurality of male or external splines or gear teeth 102 which are complementary to and engage internal or female splines or gear teeth 104 on a carrier 106. The carrier 106 supports a plurality of stub shafts 108, one of which is illustrated in FIG. 2, which each receives one of a first plurality of planet gears 110 having gear teeth 112 which are in constant mesh with gear teeth 114 on a first or front sun gear 116 integrally formed with or secured to the secondary or front output shaft 32.

The planetary gear differential assembly 100 also includes a second plurality of elongate planet gears 120 which are freely rotatably disposed upon a like plurality of elongate stub shafts 122 supported by and secured to the carrier 106. Journal bearings or anti-friction bearings such as needle bearing assemblies 124 may be utilized between the second plurality of elongate planet gears 120 and the elongate stub shafts 122. The second plurality of elongate planet gears 120 includes gear teeth 126 which are complementary to and are in constant mesh with the gear teeth 112 on the first plurality of planet gears 110. Also in constant mesh with the teeth 126 on the second plurality of elongate planet gears 120 are gear teeth 128 on a second or rear sun gear 132 integrally formed with or secured to the primary or rear output shaft 22.

The input shaft 18 preferably includes a reduced diameter region 136 about which is disposed an anti-friction bearing such as a roller bearing assembly 138. The primary output shaft 22 includes a counter bore or blind aperture 142 which receives the roller bearing assembly 138. If desired, flat friction reducing washers 144 may be disposed between the various gears 116 and 132 and the central portion of the carrier 106.

The components of the planetary gear differential assembly 100 just described function as and provide conventional differential action whereby the input shaft 18 drives the two output shafts 22 and 32 and the gearing accommodates a disparity between the rotational speeds of the two output shafts 22 and 32.

The variable differential assembly 16 also includes a pair of eccentric gear trains 150A and 150B which are essentially identical but which operate in association with the primary or rear output shaft 22 and the secondary or front output shaft 32, respectively. As such, only one of the eccentric gear trains, the gear train 150B, will be described, it being understood that the components of the companion gear train 150A are, for all intents and purposes, the same.

Included in the carrier 106 of the differential assembly 100 is a ring gear 152 having internal or female gear teeth 154 which are in mesh with male or external gear teeth 156 on an eccentric ring gear 160. The eccentric ring gear 160 is supported within the housing 98 of the variable differential assembly 16 for free rotation on an axis offset from the axis of the shafts 18, 22 and 32 by annular bearings such as a journal bearing 162. Alternatively, the journal bearing 162 may be replaced with an anti-friction bearing such as a roller bearing assembly (not illustrated). The eccentric ring gear 160 also includes internal or female gear teeth 164 which are in constant mesh with male or external gear teeth 166 formed on a spur gear 170 disposed coaxially with the axis of the input shaft 18 and the front or secondary output shaft 32. The spur gear 170 includes internal or female splines or gear teeth 172.

The variable biasing differential 100 also includes a pair of symmetrically disposed rear and front friction clutch assemblies 180A and 180B. Once again, since they are the same but for their left and right hand sense, only the rear clutch assembly 180A will be described. For purposes of clarity, however, reference numbers appear in both assemblies. The friction clutch assembly 180A includes a bell shaped housing 182 having a smaller diameter cylindrical collar 184 defining male splines or gear teeth 186 which are complementary to and engage the female splines or gear teeth 172 on the spur gear 170. The bell shaped housing 182 includes internal, axially extending female splines 188 which engage a first plurality of complementarily splined larger diameter main friction clutch plates or disks 190. Interleaved with the first plurality of larger diameter main clutch plates or disks 190 are a second plurality of smaller diameter main clutch plates or disks 192. Clutch paper or other suitable facing material is secured to the faces of the first and second pluralities of main clutch plates or disks 190 and 192. The second plurality of smaller diameter main clutch plates or disks 192 include internal or female splines which are complementary to and engage male or external splines 196 on a circular collar or hub 200. The collar or hub 200 includes female or internal splines or gear teeth 202 which engage complementarily configured male or external splines or gear teeth 204 on the primary or rear output shaft 22. The collar or hub 200 thus rotates with the primary or rear output shaft 22.

Figure 6:
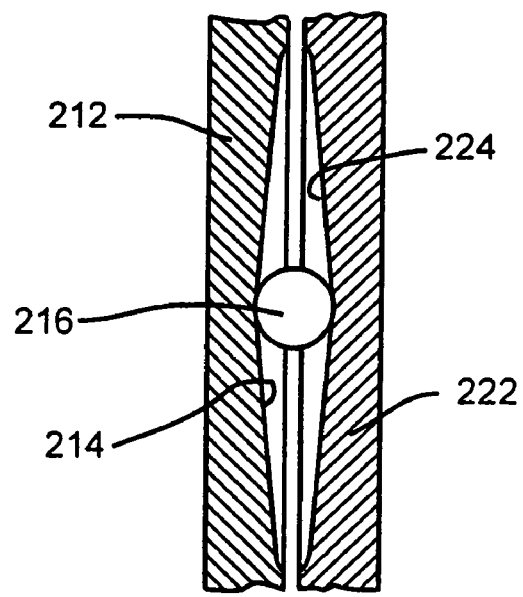
FIG. 6 is a flat pattern development of a ball ramp operator of a first embodiment of a variable biasing differential according to the present invention taken along line 6-6 of FIG. 2.

Referring now to FIGS. 2 and 6, the rear friction clutch assembly 180A also includes a rear ball ramp operator assembly 210A. The front friction clutch assembly 180B likewise includes a front ball ramp operator assembly 210B. Once again, because the ball ramp operator assemblies 210A and 210B are identical except for their mirror image disposition, only the rear ball ramp operator 210A will be described, although for reasons of clarity, reference numbers may appear in either assembly. The rear ball ramp operator assembly 210A includes a first or primary circular apply plate 212 having a plurality of arcuate recesses 214 which receive a like plurality of load transferring balls 216. The first circular apply plate 212 includes internal or female spines or gear teeth 218 which are complementary to the male or external splines or gear teeth 196 on the collar or hub 200. Accordingly, the first circular apply plate 212 rotates with the collar or hub 200.

Disposed adjacent the first circular apply plate 212 is a smaller diameter circular member 222. The smaller diameter circular member 222 includes a like plurality of arcuate recesses 224 which also receive the load transferring balls 216. It will be appreciated that the plurality of ramped recesses 214 and 224 and the load transferring balls 216 may be replaced with other analogous mechanical elements which cause axial displacement of the apply plate 212 and the circular member 222 in response to relative rotation therebetween. For example, tapered rollers disposed in complementarily configured conical helices or opposed cams having complementary multiple oblique surfaces may be utilized.

The smaller diameter circular member 222 defines external or male splines 228 which receive and drive a first plurality of smaller diameter pilot clutch plates or disks 232 having internal or female splines. Interleaved with the first plurality of pilot clutch plates or disks 232 is a second plurality of larger diameter pilot clutch plates or disks 234 having external or male splines which are complementary to and engage the splines 188 on the interior surface of the bell shaped housing 182. Accordingly, the second plurality of pilot clutch plates or disks 234 rotates therewith.

A circular plate or thick flat washer 236 includes male or external splines 238 which engage the splines 188 on the bell shaped housing 182 and it thus rotates therewith. Preferably, a thin thrust washer 240 is disposed between the flat washer 236 and first circular apply plate 212 and reduces friction therebetween. A thrust bearing 242 is disposed adjacent the smaller circular member 222 and is retained in position on the collar or hub 200 by a snap ring 244 which seats within a complementarily configured circumferential channel or groove 246 formed in the collar or hub 200. An axially moving actuator plate 250 engages a thrust bearing 252 and a second circular apply plate 254 which is translated axially toward the clutch pack assemblies 180 by an actuator rod 256 which in turn is axially, bidirectionally translated by a bidirectional electric actuator 260. The bidirectional actuator 260 is under the control of the microprocessor 56 illustrated in FIG. 1A.

The operation of the variable biasing differential assembly 16 will now be described with reference to FIG. 2. As noted above, it will be appreciated that the input shaft 18 and the planetary gear differential assembly 100 including the carrier 106, the planet gears 110 and 120, the front sun gear 116 and the rear sun gear 132 as well as the respective associated output shafts 32 and 22 operate as a conventional planetary gear differential disposed in the center of the vehicle, a configuration often referred to as a center differential.

With regard to the planetary gear differential assembly 100, it should be noted that the diameters of the sun gears 116 and 132, as illustrated, are not equal. The rear sun gear 132 is larger than the front sun gear 116 so that the meshing elongate planetary gears 120 will not interfere with the rotation of the front sun gear 116. This difference in diameters results in a differential ratio dependent upon the relative diameters but which will never be closer to being equal than a 48:52 ratio. This ratio, when the differential assembly 100 is in an unbiased state, is considered to be equal. This ratio, however, may be increased if desired by adjusting the relative diameters of the sun gears 116 and 132.

Driven by the carrier 106 are the respective front and rear offset or eccentric ring gears 160. These drive the spur gears 170 and the associated, respective bell housings 182 at a speed which is slightly slower than the non-differentiated speed of the respective output shafts 18 and 22. When the electric actuator 260 translates the shift rod 256 either to the left or to the right to engage the friction clutch packs 180A or 180B, compression of the main clutch plates or discs 190 and 192 by the associated primary circular apply plate 212 transmits a torque from the associated rear or front output shaft 22 or 18 to the clutch housing 182 which is reflected back through the eccentric gearing and the planetary gear differential assembly 100 to the other output shaft 18 or 22.

Thus, the differential is capable of transferring torque from a slower rotating output to a faster rotating shaft. This configuration also reduces the torque transmitted through the main clutch plates 190 and 192 and reduces the speed differences at the friction surfaces. The reduced torque and reduced speed both contribute to reducing the heat produced in the clutches and thus enhances the life of the clutches and the differential assembly 16.

It should be noted that the friction clutch assemblies 180A and 180B are and are intended to be slipping clutches as opposed to locking clutches and do not and are not intended to operate in a locked mode which would typically result in a 20% speed overrun of one output over the other.

It should also be noted that while other, including single and dual electric, pneumatic or hydraulic actuators or operators of diverse designs may be utilized in place of the single electric actuator 260, a single actuator provides all necessary operational action as there is never need nor reason to apply both clutch assemblies 180A and 180B simultaneously.

Figure 1B:
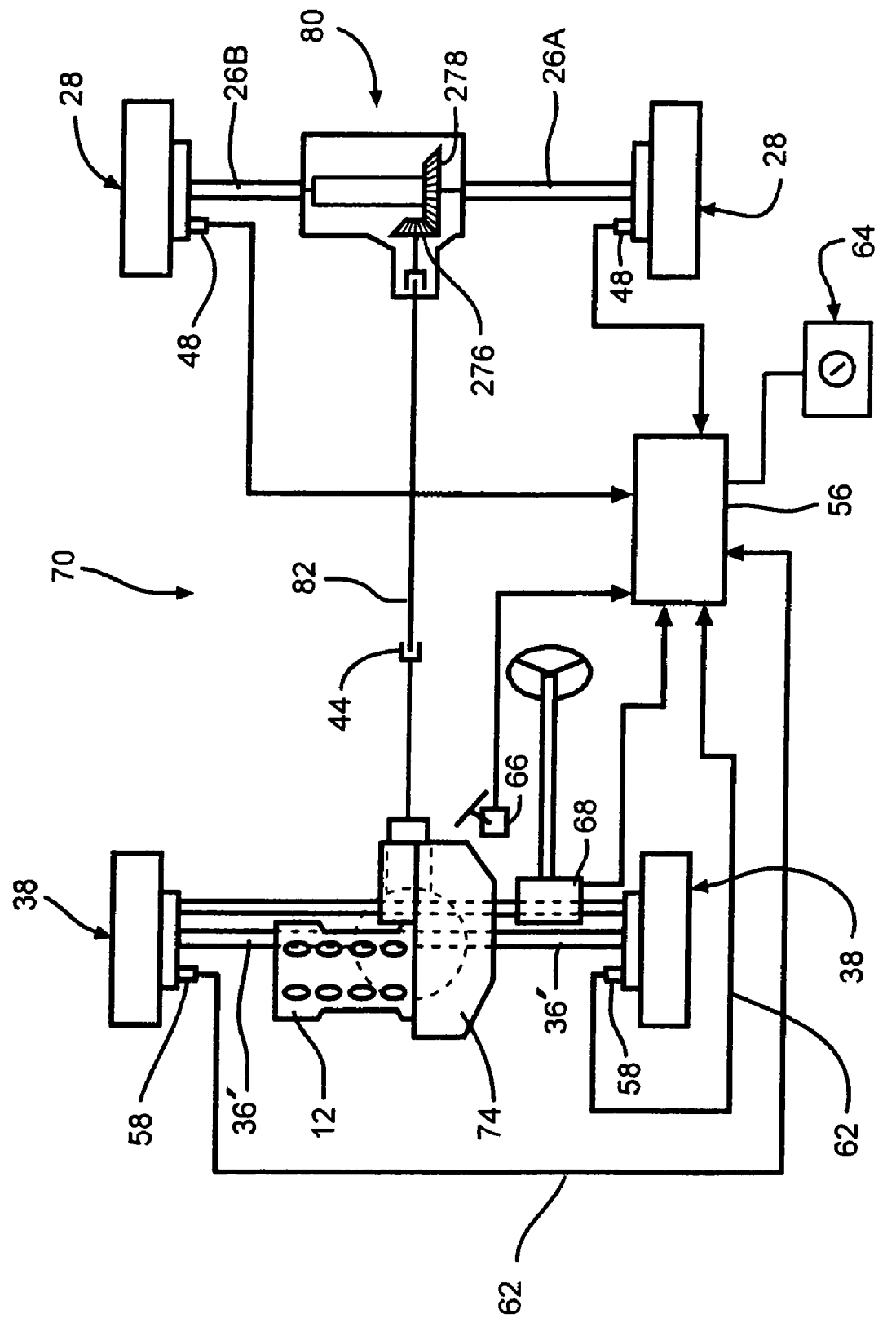
FIG. 1B is a diagrammatic view of a motor vehicle drive train having a variable biasing differential according to the present invention disposed in a rear axle.

Referring now to FIG. 1B, a four wheel vehicle drivetrain utilizing the present invention in a rear axle is diagrammatically illustrated and designated by the reference number 70. The four wheel vehicle drivetrain 70 includes a prime mover 12 such as an internal combustion or Diesel engine. The prime mover 12 may be either longitudinally or transversely oriented. The prime mover 12 has an output which is coupled to and directly drives a transaxle 74. A first output of the transaxle 74 directly drives an alternate embodiment variable biasing rear differential assembly 80 through a prop shaft 82. The variable biasing rear differential assembly 80 provides drive torque to a pair of live rear axles or shafts 26A and 26B and a respective pair of rear tire and wheel assemblies 28.

The transaxle 74 also provides drive torque to a pair of live front axles 36' and a respective pair of front tire and wheel assemblies 38. Finally, the prop shaft 82 may include suitable and appropriately disposed universal joints 84 which accommodate static and dynamic offsets and misalignments between the prop shaft 82 and associated components.

Disposed in sensing relationship with each of the rear tire and wheel assemblies 28 is a rear wheel speed sensor 48. The wheel speed sensors 48 may be independent or may be the same sensors utilized with, for example, an antilock brake system (ABS) or other vehicle traction control or stability system. Signals from the sensors 48 are provided in lines 52 to a microprocessor 56. Similarly, disposed in sensing relationship with each of the front tire and wheel assemblies 38 are respective front wheel speed sensors 58 which provide signals to the microprocessor 56 in the lines 62. Once again, the sensors 58 may be independent or may be part of or shared with an antilock brake system or other vehicle traction control or stability system.

Optionally, an operator selectable switch 64 or set of push buttons may be utilized and will be generally disposed within reach of the vehicle operator in the passenger compartment (not illustrated). The switch 64 may be adjusted, for example, to enable or disable the variable biasing differential assembly 16. Additionally, a throttle position sensor 66 may be utilized to provide a signal to the microprocessor 56 indicative of the real time position of the throttle or accelerator pedal and a steering angle sensor 68 may similarly provide a signal to the microprocessor 56 indicative of the real time angular orientation of the front tire and wheel assemblies 38.

Figure 7:
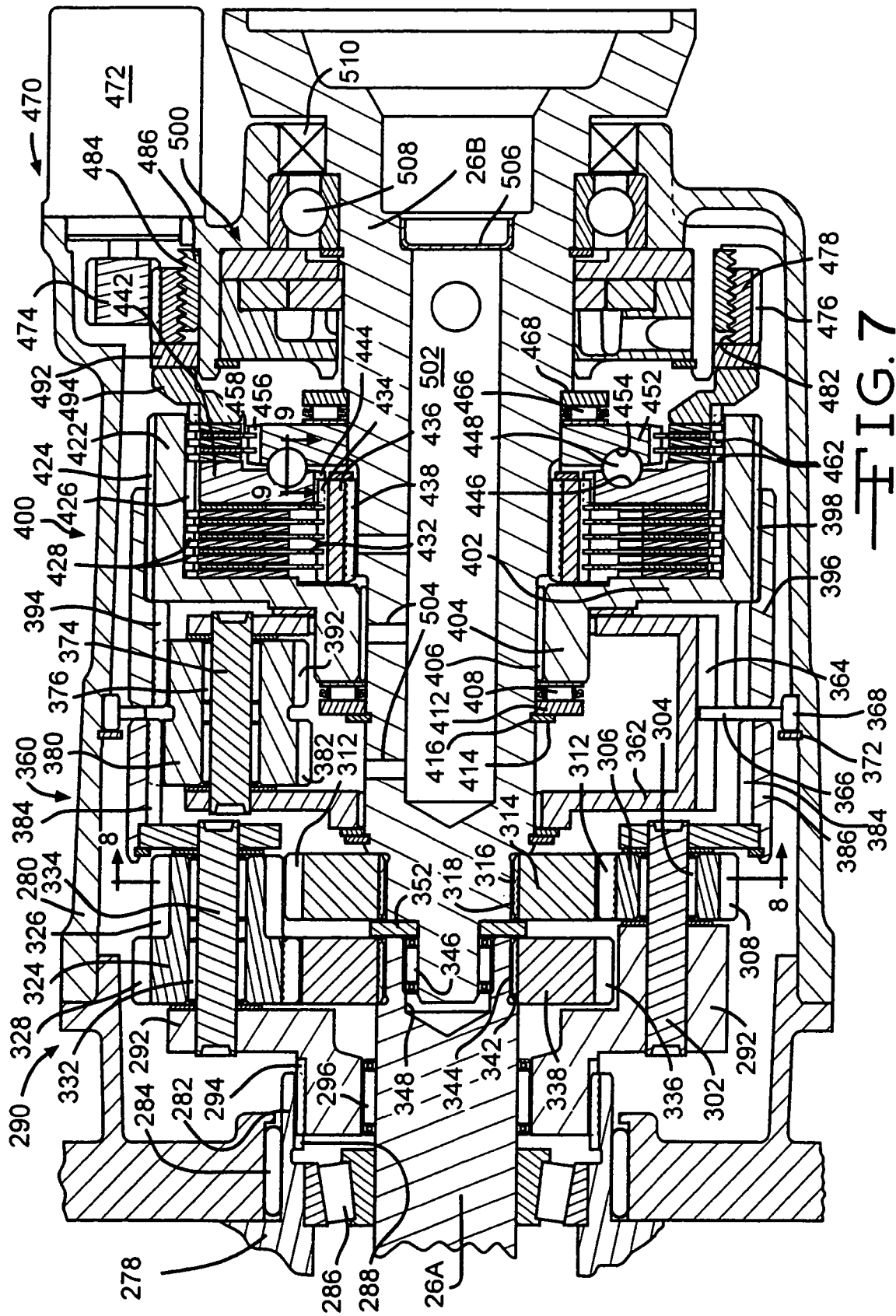
FIG. 7 is a full, sectional view of a second embodiment of a variable biasing differential according to the present invention.

Referring now to FIGS. 1B and 7, the second embodiment variable biasing differential 80 includes a first, smaller bevel gear 276 which drives a second, larger bevel gear 278 which are both received within a cylindrical housing 280. A cylindrical extension 282 of the larger bevel gear 278 is supported in the housing 280 within a journal or anti-friction bearing assembly 284. Additionally, the extension 282 of the larger bevel gear 278 is supported by a tapered roller bearing assembly 286 which in turn is supported by the left rear axle 26A. The cylindrical extension 282 of the larger bevel gear 278 includes internal or female splines or gear teeth 288.

Figure 8:
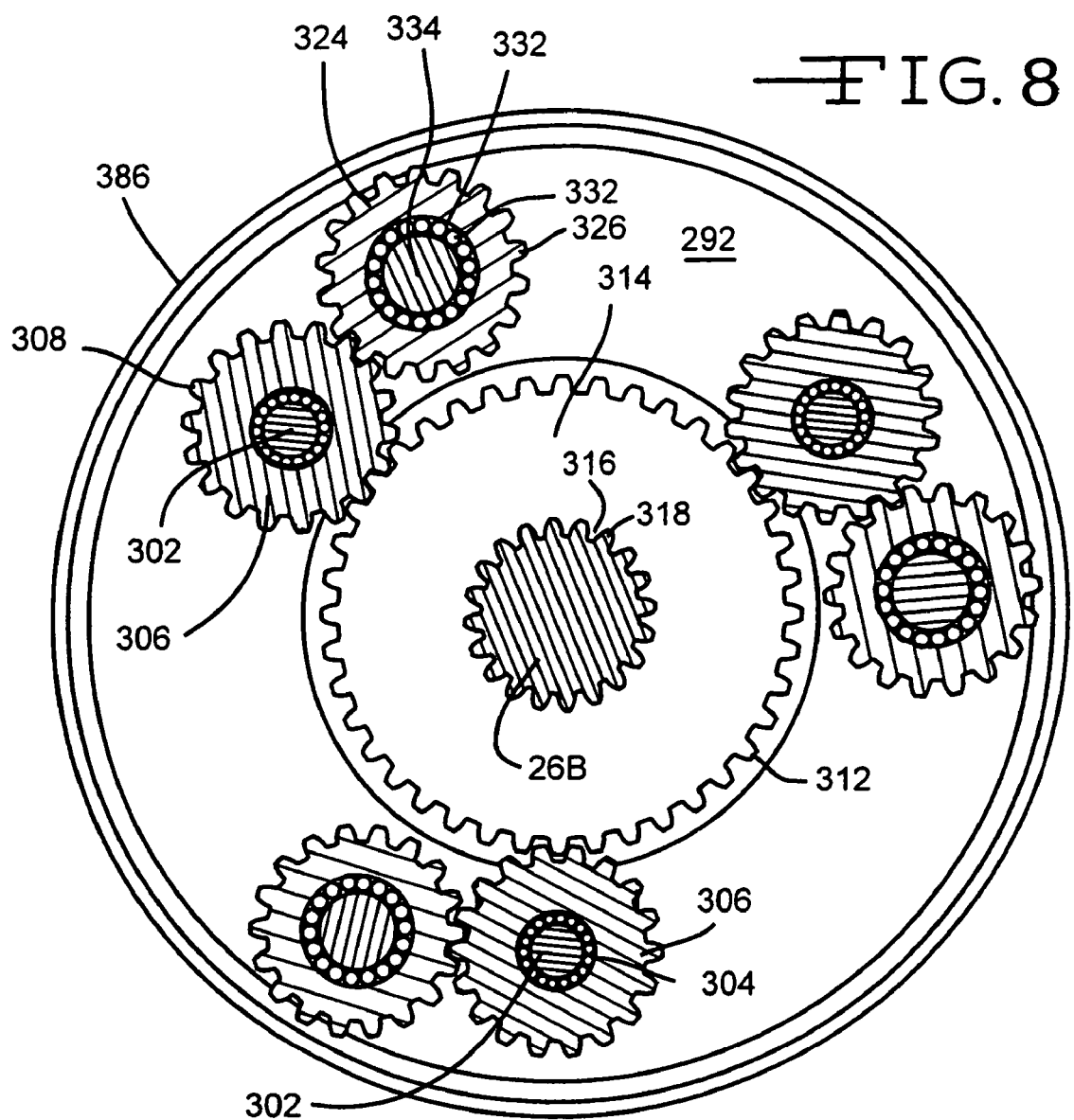
FIG. 8 is a full, sectional view of a second embodiment of a variable biasing differential according to the present invention taken along line 8-8 of FIG. 7.

Referring now to FIGS. 7 and 8, the second embodiment variable biasing differential assembly 80 also includes a planetary gear differential assembly 290. The planetary gear differential assembly 290 includes a carrier 292 includes a reduced diameter portion having external or male splines or gear teeth 294 which mate within and are complementary to the internal or female splines or gear teeth 288 on the larger bevel gear 278. The reduced diameter portion of the carrier 292 is freely rotatably supported upon the left rear axle 26A by a roller bearing assembly 296. Secured to the carrier 292 for rotation therewith are a first plurality of stub shafts 302, one of which is illustrated in FIG. 7. Each of the first plurality of stub shafts 302 supports an anti-friction roller bearing assembly 304 which, in turn, freely rotatably supports a planet gear 306. The planet gears 306 include exterior male gear teeth 308 which are complementary to and in constant mesh with gear teeth 312 on a first or right side sun gear 314. The first or right side sun gear 314 includes female or internal splines or gear teeth 316 which are complementary to and mate with external or male splines or gear teeth 318 formed on an end adjacent portion of the right rear axle 26B.

Also driven by the first plurality of planet gears 306 is a second plurality of planet gears 324 having a first, smaller diameter set of gear teeth 326 and a second, larger diameter set of gear teeth 328. The second plurality of planet gears 324 are rotatably disposed upon anti-friction roller bearing assemblies 332 which in turn are supported by a plurality of stub shafts 334 which are received within and secured to the carrier 292. The larger diameter gear teeth 328 of the second plurality of planet gears 324 are in constant mesh with gear teeth 336 on a second or left side sun gear 338. The second or left side sun gear 338 includes internal or female splines or gear teeth 342 which are complementary to and mate with exterior or male splines or gear teeth 344 on the left rear axle 26A. A roller bearing assembly 346 which is received within a counter bore 348 of the left rear axle 26A rotatably supports and stabilizes the rear axles 26A and 26B relative to one another. A flat washer 352 disposed between the first sun gear 314 and the second sun gear 338 reduces friction therebetween and maintains these gears in their proper axial positions. It will be appreciated that the planetary gear differential 290 just described operates as a conventional differential to accommodate speed differences between the rear axles 26A and 26B when, for example, an associated vehicle turns a corner.

Referring again to FIG. 7, the second embodiment rear variable biasing differential assembly 80 also includes a differential drive assembly 360. The differential drive assembly 360 includes a U-shaped housing 362 having longitudinal exterior grooves 364 which are engageable by radially disposed stops or pins 366 to maintain the housing 362 stationary within the differential assembly 80. The radial pins 366 may be secured and stabilized by suitable components such as a circumferential ring 368 and a snap ring 372.

Preferably disposed at 120° intervals within the stationary housing 362 are three stub shafts 374, one of which is illustrated in FIG. 7. The stub shafts 374 are secured to the stationary housing 362 and are thus also stationary. The three stub shafts 374 support roller bearing assemblies 376 which, in turn, freely rotatably support three dual diameter gears 380. The dual diameter gears 380 include a first, larger diameter set of external or male gear teeth 382 which are complementary to and in constant mesh with internal or female gear teeth 384 on a first collar 386 which is secured to and rotates with the carrier 292 of the planetary gear differential assembly 290. The three dual diameter gears 380 also include sets of smaller diameter external or male gear teeth 392 complementary to and in constant mesh with internal or female gear teeth 394 on a second cylindrical collar 396. The second cylindrical collar 396 includes internal or female splines or gear teeth 398.

The variable biasing rear differential assembly 80 also includes a ball ramp clutch assembly 400. The ball ramp clutch assembly 400 includes a bell shaped housing 402 having a smaller diameter hub region 404 which is freely rotatably disposed about the right axle 26B upon a journal or anti-friction bearing assembly 406. A thrust bearing 408 maintains the axial position of the housing 402 relative to the right axle or shaft 26B and the axial position of the thrust bearing 408 and an adjacent flat washer 412 is maintained by a snap ring 414 which is received within a suitable circumferential groove 416 in the right axle or shaft 26B.

The housing 402 includes a larger diameter portion 422 having external or male splines or gear teeth 424 which are complementary to and engage the female splines 398 on the second cylindrical collar 396. Thus, the housing 402 rotates with the second cylindrical collar 396. On the interior surface of the larger diameter portion 422 of the housing 402 are a plurality of longitudinally extending internal or female splines or gear teeth 426. The plurality of internal splines or gear teeth 426 are engaged by complementarily configured splines on a first plurality of larger diameter main friction clutch plates or discs 428. Interleaved with the first plurality of larger diameter main clutch plates or discs 428 are a second plurality of smaller diameter main clutch plates or discs 432. Both the first and second pluralities of main clutch plates or discs 428 and 432 include suitable clutch paper or facing material as will be readily appreciated.

Figure 9:
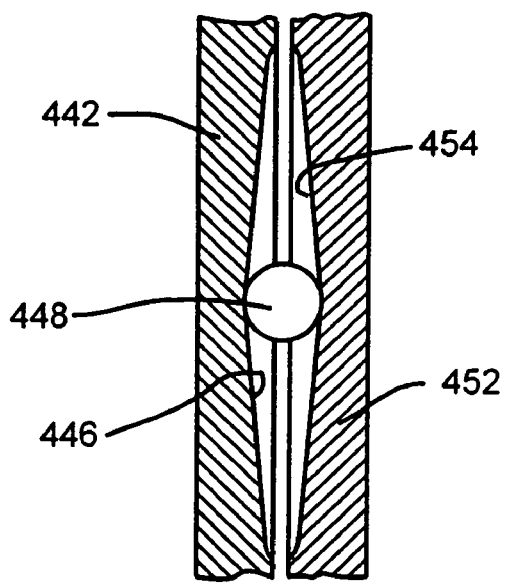
FIG. 9 is a flat pattern development of a ball ramp operator of a second embodiment of a variable biasing differential according to the present invention taken along line 9-9 of FIG. 7.

The smaller diameter friction clutch plates or discs 432 include splines which are engaged by external splines 434 on a clutch hub or collar 436. In turn, the clutch collar 436 is splined by an interengaging set of splines 438 to the right rear axle or shaft 26B. A circular apply plate 442 also includes internal or female splines 444 which engage the male splines 434 on the clutch collar 436. Thus, the circular apply plate 442 rotates with the clutch collar 436 and the right rear axle or shaft 26B. As illustrated in FIGS. 7 and 9, the circular apply plate 442 includes a plurality of spaced apart arcuate recesses 446 which each receive one of a like plurality of load transferring balls 448. Typically, and preferably three arcuate recesses 446, spaced at 120° intervals, will be utilized. A circular member 452 includes a like plurality of similarly spaced apart recesses 454 which likewise receive and trap the load transferring balls 448. It will be appreciated that the plurality of ramped recesses 446 and 454 and the load transferring balls 448 may be replaced with other analogous mechanical elements which cause axial displacement of the circular apply plate 442 and the circular member 452 in response to relative rotation therebetween. For example, tapered rollers disposed in complementarily configured conical helices or opposed cams having complementary multiple oblique surfaces may be utilized.

The circular member 452 includes male or external splines 456 which are engaged by a first plurality of smaller diameter pilot clutch plates or discs 458. Interleaved with the first plurality of smaller diameter pilot clutch plates or discs 458 is a second plurality of larger diameter pilot clutch plates or discs 462. The larger diameter pilot clutch plates or discs 462 engage the splines 426 on the housing 402 and thus rotate therewith. Both the smaller and larger diameter pilot clutch plates 458 and 462 include suitable clutch paper or facing material as will be readily appreciated. The axial position of the circular member 454 is maintained by a thrust bearing 466 which abuts a shoulder 468 in the right rear axle 26B.

The variable biasing rear differential assembly 80 also includes an actuator assembly 470. The actuator assembly 470 includes a bidirectional, fractional horsepower electric motor 472 which bi-directionally drives a pinion gear 474. The pinion gear 474 engages peripheral external gear teeth 476 on a ring gear 478 having internal or female threads 482. The internal threads 482 are complementary to and engage external or male threads 484 on a stationary ring member 486. As the pinion 474 bi-directionally rotates, the ring gear 478 likewise rotates and translates axially at greatly reduced speed and with increased torque. The ring gear 478 engages a circular washer or spacer 492 which, in turn, engages a generally circular, obliquely extending transfer member 494 which engages and compresses the first and second pilot clutch plates 458 and 462.

The variable biasing rear differential assembly 80 also includes a lubrication pump 500 which provides a flow of lubricating fluid to an axial passageway 502 in the right axle 26B. A plurality of radial ports 504 distribute the fluid to the various components of the differential assembly 80. A fluid tight seal 506 closes off the open end of the axial passageway 502. An anti-friction bearing such as a ball bearing assembly 508 rotatably supports the right rear axle 26B within the housing 280 and an oil seal 510 provides a suitable fluid impervious seal therebetween.

Operation of the second embodiment variable biasing differential assembly 80 will now be described with reference to FIG. 7. As noted above, the planetary gear differential assembly 290 operates as a conventional differential assembly to permit disparate rotational speeds between the rear axles 26A and 26B while providing drive torque thereto from the larger diameter bevel gear 278. Because of the distinct diameters of the gears 326 and 328 within the differential assembly 290, there will be an unequal torque split which will transfer or pre-bias the torque to, for example, the rear wheels of a rear wheel drive vehicle such that they receive 60% of the drive torque and the front wheels receive 40% of the drive torque.

The operation of the second embodiment variable biasing differential assembly 80 is similar to the first embodiment variable biasing differential assembly 16 in that because of the speed reduction achieved through the differential drive assembly 360, the output of the differential drive assembly 360 and specifically the bell-shaped housing 422 of the friction clutch pack assembly 400 will be turning at a slower speed than the carrier 292. Accordingly, when the friction clutch pack assembly 400 is activated by energization of the bidirectional electric motor 472, torque is reflected through the friction clutch pack assembly 400 from the right output shaft 26B, through the differential gear train 360 and into the left output shaft 26A. Whereas bias initially might be 60% to the shaft 26B and 40% to the shaft 26A, activation of the friction clutch pack 400 can deliver 80% torque to the left axle 26A and 20% torque to the right axle 26B.

In the foregoing descriptions, the first embodiment variable biasing differential assembly 16 is illustrated and described as a center or interaxle differential whereas the second embodiment variable biasing differential assembly 80 is illustrated and described as a rear differential. It should be appreciated that inasmuch as both differential assemblies 16 and 80 may be set to deliver equal torque or initial pre-bias in one direction, i.e., significantly more torque delivered to the rear axle in normal operating conditions and then activated to deliver significantly more torque to the front of the vehicle, both differential assemblies 16 and 80 are suitable for installation in either the center differential or rear axle location illustrated in FIGS. 1A and 1B, respectively.

The foregoing disclosure is the best mode devised by the inventor for practicing this invention. It is apparent however, that devices incorporating modifications and variations will be obvious to one skilled in the art of motor vehicle differentials. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A variable biasing differential for a motor vehicle driveline comprising, in combination,
a drive member,
a first driven member,
a second driven member,
a differential having a carrier driven by said drive member and driving said first driven member and said second driven member, a speed reducing gear train having an input driven by said differential carrier and an output, wherein said gear train includes a plurality of gears having a portion of larger diameter and a portion of smaller diameter, said portion of larger diameter driven by said carrier and said portion of smaller diameter operably driving a first clutch disc, a non-locking friction clutch having said first clutch disc coupled to said output of said gear train and a second clutch disc coupled to one of said driven members, and an actuator for selectively and partially engaging said friction clutch.

2. The variable biasing differential of claim 1 wherein said variable biasing differential is utilized as a center differential.

3. The variable biasing differential of claim 1 wherein said variable biasing differential is utilized as a rear axle differential.

4. The variable biasing differential of claim 1 further including a second speed reducing gear train and a second non-locking friction clutch.

5. The variable biasing differential of claim 1 wherein said actuator includes a ball ramp operator and a pilot friction clutch pack.

6. The variable biasing differential of claim 1 wherein said gear train includes an eccentric gear disposed intermediate said housing and said friction clutch.

7. A variable biasing differential for a vehicle drive train comprising, in combination, a drive member, a first driven member disposed on an axis, a second driven member disposed on said axis, a differential having a carrier driven by said drive member and driving said first driven member and said second driven member, a first eccentric gear train driven by said carrier and having a first reduced speed output, a first friction clutch having a first clutch component coupled to said first driven member and a second clutch component operably coupled to said first reduced speed output of said first eccentric gear train, a second eccentric gear train driven by said carrier and having a second reduced speed output, a second friction clutch having a third component coupled to said second driven member and a fourth clutch component operably coupled to said second reduced speed output of said second eccentric gear train, and an actuator for independently engaging said first and said second friction clutches.

8. The variable biasing differential of claim 7 wherein said variable biasing differential is disposed in said drive train as a center differential.

9. The variable biasing differential of claim 7 wherein said variable biasing differential is disposed in said drive train as a rear axle differential.

10. The variable biasing differential of claim 7 wherein said first driven member is coupled to a front prop shaft and said second driven member is coupled to a rear prop shaft.

11. The variable biasing differential of claim 7 wherein said actuator includes a ball ramp mechanism having a pair of adjacent members defining arcuate recesses and load transferring members disposed in said recesses.

12. The variable biasing differential of claim 7 wherein said actuator is electric and has a linear, bi-directional output.

13. The variable biasing differential of claim 7 wherein said actuator includes a ball ramp operator and pilot friction clutch pack.

14. A variable biasing differential comprising, in combination, a drive member disposed on an axis, a first driven member disposed on said axis, a second driven member disposed on said axis, a geared differential having a carrier driven by said drive member and driving said first driven member and said second driven member with a substantially unequal bias therebetween, a gear train driven by said carrier having a reduced speed output, a non-locking friction clutch having a first clutch member coupled to one of said driven members and a second clutch member coupled to said reduced speed output of said gear train, an actuator for selectively applying force to partially engage said friction clutch whereby said unequal bias is variable.

15. The variable biasing differential of claim 14 wherein said variable biasing differential is disposed as a center differential.

16. The variable biasing differential of claim 14 wherein said actuator includes a ball ramp actuator, a pilot friction clutch and bi-directionally translating means for engaging said non-locking friction clutch.

17. The variable biasing differential of claim 14 wherein said gear train includes a plurality of gears having a portion of larger diameter and a portion of smaller diameter, said portion of larger diameter driven by said carrier and said portion of smaller diameter driving said second clutch member.

18. A variable biasing differential comprising, in combination, a drive member disposed on an axis, a first driven member disposed on said axis, a second driven member disposed on said axis, a geared differential having a housing driven by said drive member and driving said first driven member and said second driven member, a gear train driven by said housing having a reduced speed output, a friction clutch having a first clutch member coupled to one of said driven members and a second clutch member coupled to said reduced speed output of said gear train, an actuator for selectively applying engagement force to said friction clutch, said actuator including an electric motor, a threaded ring gear driven by said electric motor, whereby said ring gear translates axially in response to rotation of said electric motor.

* * * * *